United States Patent [19]

Pollet

[11] 4,327,678
[45] May 4, 1982

[54] SUPPORT DEVICE FOR THE SET OF VALVE ROCKERS OF AN INTERNAL COMBUSTION ENGINE, PARTICULARLY A LARGE-SIZE ENGINE

[75] Inventor: Jean-Pierre Pollet, Arnouville les Gonesse, France

[73] Assignee: Societe d'Etudes de Machines Thermiques S.E.M.T., Saint-Denis, France

[21] Appl. No.: 109,665

[22] Filed: Jan. 4, 1980

[30] Foreign Application Priority Data

Jan. 31, 1979 [FR] France ................. 79 02507

[51] Int. Cl.³ ............................................. F01L 1/26
[52] U.S. Cl. .............................. 123/90.4; 123/90.39
[58] Field of Search ............... 123/90.22, 90.39, 90.40, 123/90.41, 189; 74/519, 559

[56] References Cited

U.S. PATENT DOCUMENTS

| | | | |
|---|---|---|---|
| 2,610,617 | 9/1952 | Pielstick | 123/90.4 |
| 2,619,078 | 11/1952 | Witzky et al. | 123/90.41 |
| 3,428,032 | 2/1969 | Rudert | 123/90.4 |
| 3,712,278 | 1/1973 | Kuhn | 123/90.39 |
| 3,821,942 | 7/1974 | Ishida et al. | 123/90.39 |
| 3,967,601 | 7/1976 | Heberle | 123/90.39 |

Primary Examiner—Charles J. Myhre
Assistant Examiner—W. R. Wolfe
Attorney, Agent, or Firm—Kenyon & Kenyon

[57] ABSTRACT

A support device for the set of rockers of an internal combustion engine, the device comprising a forked rocker for the operation of two exhaust valves and one rocker with two arms for the operation of two inlet valves. The shaft of the exhaust rocker is secured to the support block by separate individual stud bolts in order to be removable without removing the inlet rocker.

9 Claims, 3 Drawing Figures

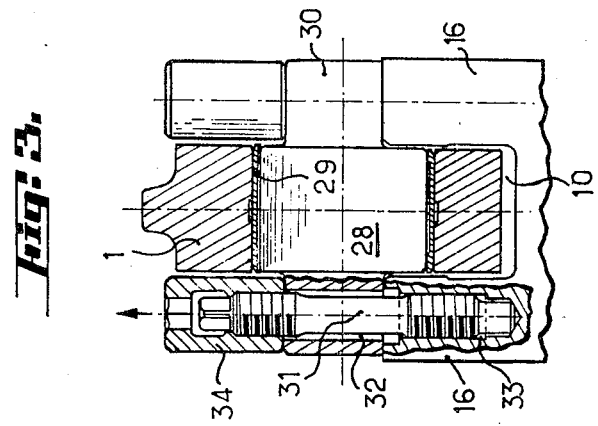
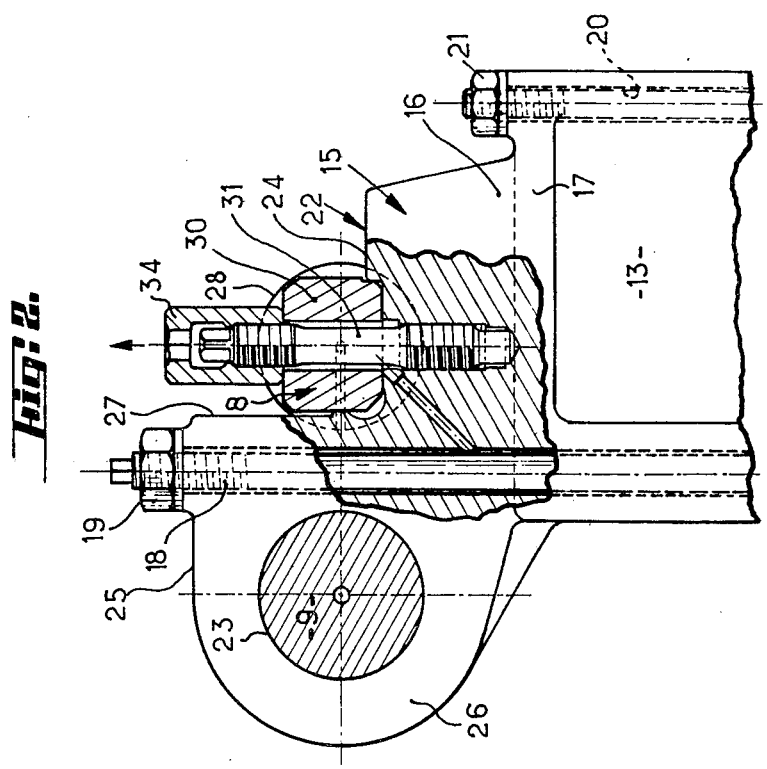

SUPPORT DEVICE FOR THE SET OF VALVE ROCKERS OF AN INTERNAL COMBUSTION ENGINE, PARTICULARLY A LARGE-SIZE ENGINE

The present invention relates to a support device for the set of valve rockers of an internal combustion engine, particularly a large-size engine, comprising an inlet valve device and an exhaust valve device, both operated by a single rocker device actuated through the medium of a push-rod by an operating cam moved by the engine.

Support devices for the set of valve rockers of an internal combustion engine are known, which comprise a supporting block removably secured on the engine cylinder head and in which are mounted the two rocker devices, each rotatable about a shaft, one of the rocker devices being arranged at the central portion of the support, and the other device, notably with two arms for simultaneous operation of two valves, being arranged laterally of the support, with one arm on either side of the latter.

This known support device suffers from the drawback that, in order to remove an exhaust valve, it is necessary to take off from the cylinder head the support together with the whole set of valve rockers. After putting back in place the set of rockers, it is necessary to adjust the clearances of all the valves. These operations, which already are time-consuming and relatively difficult to perform in the case of medium-size engines, are found to be still more complicated in the case of large-size engines, owing to the quite considerable weight of the set of valve rockers and the support.

A known way of eliminating this disadvantage in the case of a set of valve rockers comprising a forked rocker for operating the exhaust valves and a two-arm rocker for operating the inlet valves is to form for example the exhaust rockers in two parts which in the operating state constitute a rigid assembly but which can be separated from one another to allow the rocker to be moved aside from the path of the valve to be removed. The same effect may be obtained by so shaping the guide provided in the cylinder head for the valve rocker push-rod as to allow the latter to be moved aside, after being separated from the valve rocker, from the rotating path of the latter about its shaft, thus permitting the valve removing path to be cleared by rotating the entire rocker.

Such arrangements have been found to be suitable for medium-size engines, but difficult to be used in large-size engines, which present particular problems. The weight, inertia and forces involved in a large-size engine are more considerable, which requires that the supports be more rigid and the fastening means more complex. The valve rockers are therefore heavier and the free handling space on the cylinder head is more restricted. Moreover, the valves are mounted in cooled housings of relatively great size. As a result, their removal requires more complex operations and greater handling space.

The invention provides a support device which obviates the disadvantages of the known devices and allows the particular problems just set forth to be solved.

The support device for the set of valve rockers of an internal combustion engine, particularly a large-size engine, of the type comprising a supporting block removably secured on the engine cylinder head and in which are mounted two valve rocker devices, each rotatable about a shaft, one rocker device for operating an exhaust valve device and the other for operating an inlet valve device, one of the rocker devices being arranged at the central portion of the supports, and the other device, particularly of the two-arm type for simultaneously operating two valves, being located laterally of the support, is characterized, according to the invention, in that each valve rocker device is mounted in the said support so as to be selectively removable without removing the support and/or the other valve rocker device.

According to one advantageous characterizing feature of the invention, the shaft of the central rocker device is so accommodated in the support as to be removable through the top.

According to another characterizing feature of the invention, the shaft of the central rocker device is fastened on the support by two individual stud bolts.

The invention will be better understood and other purposes, characterizing features, details and advantages thereof will appear more clearly from the following explanatory description made with reference to the appended diagrammatic drawings given solely by way of example illustrating one form of embodiment of the invention and wherein:

FIG. 2 is a side view of the support device according to the invention, upon the line II—II of FIG. 1, but to a greater scale, partly broken away and without the rockers;

FIG. 3 is a partial sectional view upon the line III—III of FIG. 1, to a larger scale.

Figure 1:
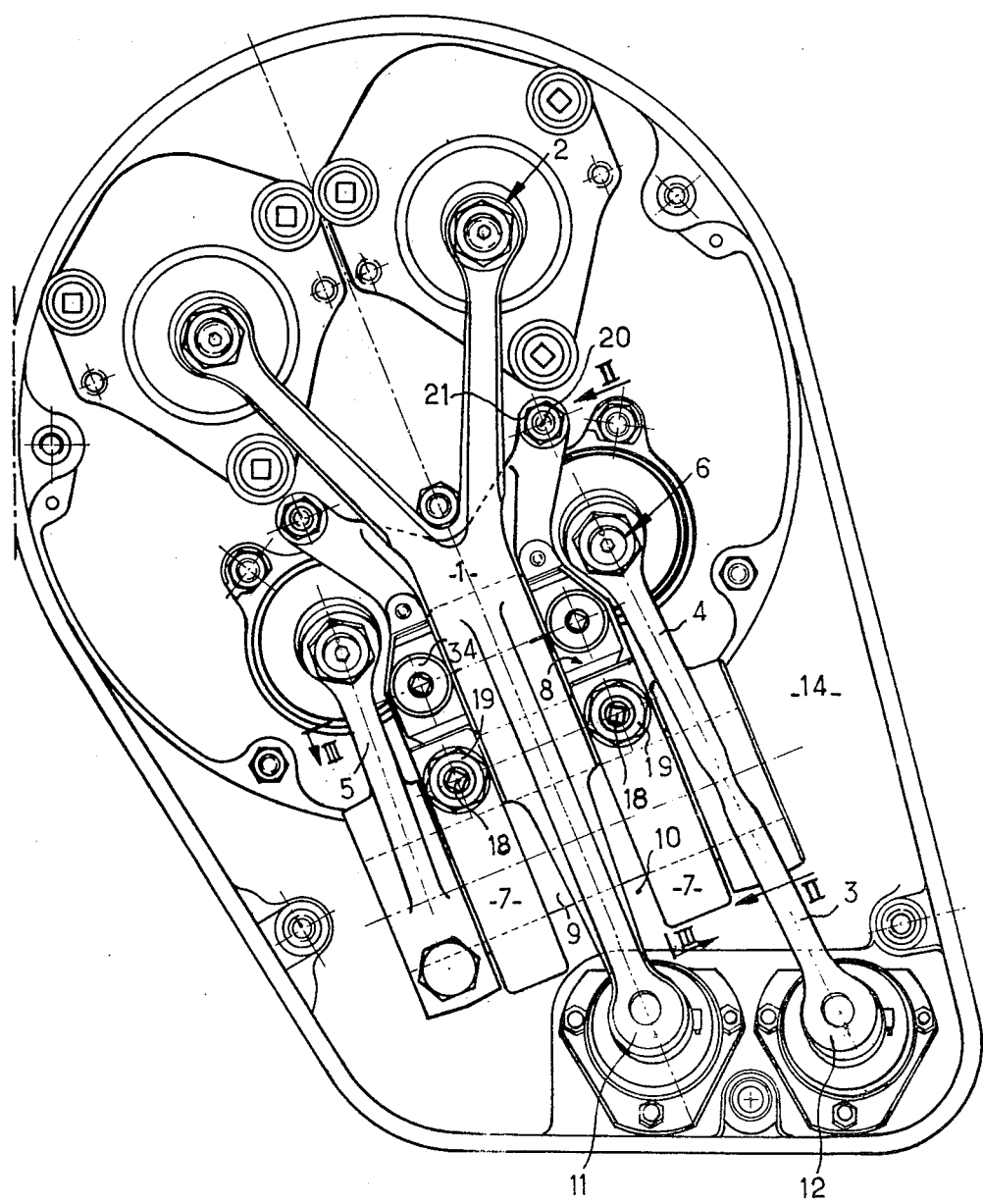
FIG. 1 is a top view of the support device for the set of rockers, mounted on the cylinder head, according to the invention.

The set of rockers illustrated in FIG. 1, designed particularly for a large-size internal combustion engine, comprises per engine cylinder: a forked rocker 1 for simultaneous operation of two exhaust valves 2 and a rocker 3 with two arms 4, 5 for simultaneous operation of two inlet valves 6. Each rocker is mounted rotatably about a shaft accommodated in a support 7. The shaft of exhaust rocker 1 is designated by the reference numeral 8. The shaft of inlet rocker 3 is denoted by the reference numeral 9. In the support, substantially at the middle thereof, is provided a space 10 through which extends the exhaust rocker 1. The two arms 4, 5 of the inlet rocker 3 are located on either side of the support 7, respectively.

The end 11, 12 of the rockers 1, 3 which is opposite to the one intended to act upon the valves 2, 6 is adapted to cooperate with a push-rod (not shown). Each push-rod is actuated by an operating cam rotating jointly with a shaft actuated by the engine. The cams and the shaft are not shown.

As appears from the Figures, the support 7 comprises a lower or base portion 13 by which it rests upon the cylinder head 14 and an upper portion adapted to the housing of the shafts 8, 9. In its upper portion 15 the support 7 has two vertical walls 16 parallel to one another and to the axis of the exhaust rocker 1. These walls define between themselves the space 10 or the passage of the exhaust rocker 1. They extend from a base portion 17 of the support upwardly, i.e. in perpendicular relationship to the plane of the cylinder head 14. The shafts 8 and 9 are supported by side walls 16 and are substantially in one and the same plane, which extends horizontally in the Figures and are parallel with one another.

The support 7 is secured on the cylinder head 14 by two long tie rods 18 provided with nuts 19 and which extend through the side walls 16 and the base 13 and substantially equally distant from the two shafts 8 and 9 and two shorter tie rods 20 with nuts 21. The latter are located in the region of the base 17 of the support 7. The longer tie rods 17 are placed in the push-rod side of the support, whereas the tie rods 20 are located in the region of the end of the support 7, which is adjacent to the valves 2, 6.

According to the invention, the shaft 8 of the exhaust rocker rests by its ends on the surfaces formed by the upper edges of the side walls 16, between the plane defined by the longer tie rods 18 and the plane in which the shorter tie rods 20 are located, so that they can be put in place or removed from the top. The shaft 9 of the inlet rocker 3 is accommodated in the bores 23 extending through the side walls and aligned with one another. The shaft 9 can therefore be put in place or removed sideways with respect to the support 7.

This is obtained by so shaping each side wall as to form, as seen in the side view of FIG. 2, a stepped profile with a lower, substantially horizontal (in the Figure) portion 24 located between a tie rod 18 and a tie rod 20 and receiving the shaft 8, an upper, substantially horizontal portion 25 upon which the nuts 19 of the tie rods 18 bear, and a portion 26 of rounded shape protruding beyond the base 13 towards the end 11 of the rocker 1 and accommodating the shaft 9. The intermediate wall region 27 located between the two horizontal portions 24, 25 extends vertically, i.e. in perpendicular relationship to the edges 24 and 25.

As appears from FIGS. 2 and 3, the shaft 8 comprises a cylindrical medial portion 28 on which is rotatably mounted the bearing bush 29 of the exhaust rocker 1, and, on either side of the cylindrical portion 28, a portion 30 of substantially rectangular cross-section.

The cylindrical central portion 28 is smaller in width than the distance between the two walls 16 so that it can be inserted therebetween. The shaft 8 rests upon the edges 24 of the side wall 16 by its end portions 30 of rectangular cross-section, the said side walls being provided to this end with an accommodating recess of appropriate rectangular shape. Each end of the shaft abuts against the vertical region 27 of the edge of a side wall 16, thus allowing a highly rigid assembly of the shaft and the supporting side walls to be obtained. The shaft 8 is secured at each end in its accommodating recess by means of a stud bolt 31 threaded at both ends. The stud bolts 31 extend through a bore 32 provided in each end portion of the shaft and in axial alignment with a tapped hole 33 cut in the corresponding side wall 16. As seen in FIG. 3, each stud bolt 31 is screwed into a tapped hole 33, whereas a cap-nut 34 is screwed on the free end of the stud bolt into abutment against the upper surface of the end portion 30 of rectangular cross-section of the shaft 8.

It should also be noted that the length of the shaft 8 is such that it does not extend axially beyond the side wall 16.

It is understood that the support device just described allows the exhaust rocker to be easily and promptly mounted and unmounted without it being necessary to remove the support and/or the inlet rocker 3, which is due to the fact that the shaft of the exhaust rocker 1 is secured on the support 7 by the individual stud bolts 31 and that the access to its accommodating recess on the support is free and clear of other parts of the rocker mechanism.

Thus, if it is desired to remove an exhaust valve 2, it is sufficient to untighten the nuts 34 of the stud bolts 31 to allow the shaft to be removed together with the exhaust rocker 1.

Of course the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A support device for a set of valve rockers of an internal combustion engine having a cylinder head with an upper surface, at least one inlet valve, and at least one exhaust valve, the support device including a support block; tie rods anchored in the cylinder head and securing the support block to the cylinder head; a central rocker device for operating at least one of said inlet and exhaust valves; a shaft for rotatably mounting said central rocker device on said support block; lateral rocker devices including two arms for simultaneously operating two other of said inlet and exhaust valves, one of said arms being located on one side and the other of said arms being located on the other side of said central rocker device; and a shaft for rotatably mounting said lateral rocker devices on said support block, wherein the improvement comprises:
   a recess provided in said support block for mounting said shaft of the central rocker device, said recess being configured for allowing upward removal of said shaft with said central rocker device from said support block without removing said tie rods from said engine cylinder head and said support block, and
   selectively removable stud bolts securing to the support block said shaft of the central rocker device in said recess.

2. A device according to claim 1, wherein the end portion of the shaft of the central rocker device has at least two parallel surfaces, one by which it rests upon its support and another upon which bears the nut screwed on said individual stud bolt extending through said end.

3. A device according to claim 1, wherein two of said tie rods are located in a plane substantially equally distant from said shafts of the said two rocker devices.

4. A device according to claim 1, wherein said central rocker device is a forked rocker for simultaneous operation of two valves.

5. A device according to claim 1, wherein said support comprises two side walls extending upwardly, with respect to the upper surface of the cylinder head, and defining therebetween a space for the passage of the central rocker device, and each end of the shaft of the latter rests upon the surface formed by the upper edge of the corresponding one of said side walls.

6. A device according to claim 5, wherein the axes of said shafts of the two rocker devices are located substantially at the same level with respect to the upper surface of said cylinder head, and the shaft of the lateral rocker devices is accommodated in aligned bores cut in said side walls.

7. A device according to claim 5, wherein each end of said shaft of the central rocker device is secured on said support by an individual stud bolt extending through said end and anchored in the corresponding side wall, and a nut screwed on the free end of the stud bolt and bearing upon said end of the shaft.

8. A device according to claim 7, wherein each end of said shaft of the central rocker device is inserted in a recess of appropriate shape provided in said surface formed by the upper edge of the corresponding side wall.

9. A device according to claim 7, wherein the valve device operated by the central rocker device is removable by untightening said nuts screwed on said individual stud bolts and by withdrawing the shaft of the central rocker device together with the central rocker device.

* * * * *